US008581896B2

(12) United States Patent
Kim

(10) Patent No.: US 8,581,896 B2
(45) Date of Patent: Nov. 12, 2013

(54) POWER SUPPLY FOR RECEIVING DIFFERENT INPUT VOLTAGES AND ORGANIC LIGHT EMITTING DISPLAY DEVICE USING THE SAME

(75) Inventor: Hyeong-Gwon Kim, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 387 days.

(21) Appl. No.: 12/763,758

(22) Filed: Apr. 20, 2010

(65) Prior Publication Data

US 2011/0007054 A1 Jan. 13, 2011

(30) Foreign Application Priority Data

Jul. 10, 2009 (KR) ........................ 10-2009-0063093

(51) Int. Cl.
*G06F 3/038* (2013.01)
*G09G 5/00* (2006.01)

(52) U.S. Cl.
USPC .......................................................... 345/211

(58) Field of Classification Search
USPC .......................................................... 345/211
See application file for complete search history.

(56) References Cited

U.S. PATENT DOCUMENTS 7,812,582 B2 * 10/2010 Chua-Eoan et al. .......... 323/282
2006/0262579 A1 * 11/2006 Chou .............................. 363/63
2007/0024256 A1 * 2/2007 Chou ............................ 323/268
2008/0111810 A1 * 5/2008 Park .............................. 345/212
2008/0246749 A1 * 10/2008 Lee et al. ...................... 345/207
2009/0174629 A1 * 7/2009 Lee ................................ 345/76
2010/0029530 A1 * 2/2010 Whiteley ...................... 510/161

FOREIGN PATENT DOCUMENTS

JP 2002-095243 3/2002
KR 1019990065926 A 8/1999
KR 1020020045442 A 6/2002
KR 1020020080998 A 10/2002
KR 10-2005-0032416 A 4/2005
KR 10-2005-0046927 A 5/2005
KR 10-0833764 B1 5/2008
KR 10-2009-0021742 A 3/2009

OTHER PUBLICATIONS

KIPO Office Action dated Feb. 9, 2011 in priority Korean patent Application No. KR 10-2009-0063093, 2 pps.

* cited by examiner

*Primary Examiner* — Kwang-Su Yang
(74) *Attorney, Agent, or Firm* — Christie, Parker & Hale, LLP

(57) ABSTRACT

A power supply configured to receive at least one of a first input voltage and a second input voltage and to generate a voltage of a first pixel power and a voltage of a second pixel power, includes: a voltage sensing unit for generating voltage sensing signals corresponding to the first input voltage and the second input voltage; a first power generating unit for receiving the first input voltage and generating the voltage of the first pixel power corresponding to the voltage sensing signals; a second power generating unit for receiving the second input voltage and generating the voltage of the first pixel power corresponding to the voltage sensing signals; and a third power generating unit for receiving the first input voltage and the second input voltage, utilizing the first input voltage or the second input voltage, and generating the voltage of the second pixel power corresponding to the voltage sensing signals.

14 Claims, 3 Drawing Sheets

POWER SUPPLY FOR RECEIVING DIFFERENT INPUT VOLTAGES AND ORGANIC LIGHT EMITTING DISPLAY DEVICE USING THE SAME

CROSS-REFERENCE TO RELATED APPLICATIONS

This application claims priority to and the benefit of Korean Patent Application No. 10-2009-0063093, filed on Jul. 10, 2009, in the Korean Intellectual Property Office, the entire content of which is incorporated herein by reference.

BACKGROUND

1. Field

The following description relates to a power supply and an organic light emitting display device using the same.

2. Description of Related Art

Recently, various flat panel display devices having reduced weight and volume as compared to cathode ray tubes (CRTs) have been developed. Among these flat panel display devices are liquid crystal display devices, field emission display devices, plasma display panels, and organic light emitting display devices, among others.

Among the flat panel display devices, the organic light emitting display device displays images using an organic light emitting diode (OLED) that generates light through the recombination of electrons and holes corresponding to a flow of current. In the organic light emitting diode OLED an emission layer is made of organic material.

The organic light emitting display device as described above has excellent color representation, a thin thickness, and other features, so that its market has been largely expanded to applications in PDAs, MP3 players, and other devices, along with cellular phones.

FIG. 1 is a circuit view of a pixel in a general organic light emitting display device. Referring to FIG. 1, the pixel includes a first transistor M1, a second transistor M2, a capacitor Cst, and an organic light emitting diode OLED.

The first transistor M1 generates a driving current, where its source is connected to a first pixel power supply ELVDD, its drain is connected to an anode electrode of the organic light emitting diode OLED, and its gate is connected to a first node N1. Therefore, the driving current flows from the source to the drain, corresponding to the voltage at the first node N1.

The second transistor M2 selectively transfers a data signal to the first transistor M1, where its source is connected to a data line Dm, its drain is connected to the first node N1, and its gate is connected to a scan line Sn. Therefore, the data signal from the data line Dm is transferred to the first node N1 corresponding to a scan signal transferred through the scan line Sn.

The capacitor Cst maintains the voltage of the data signal applied to the gate of the first transistor M1, where its first electrode is connected to the first pixel power supply ELVDD and its second electrode is connected to the first node N1.

The organic light emitting diode OLED emits light corresponding to the driving current, where an emission layer is formed between the anode electrode and the cathode electrode to emit the light corresponding to the driving current. The anode electrode of the organic light emitting diode OLED is connected to the drain of the first transistor M1, and the cathode electrode is connected to a second pixel power supply ELVSS.

In the pixel as described above, the current flowing to the organic light emitting diode OLED is represented by the following equation 1.

$$I_{oled} = \frac{\beta}{2}(Vgs - Vth)^2 = \frac{\beta}{2}(ELVDD - Vdata - Vth)^2 \qquad \text{Equation 1}$$

Here, $I_{oled}$ represents the current flowing to the organic light emitting diode OLED, Vgs represents the voltage between the gate and source of the first transistor M1, Vth represents the threshold voltage of the first transistor M1, ELVDD represents the voltage of the first pixel power supply, and β represents a constant.

In other words, a magnitude of the driving current flowing to the organic light emitting diode OLED changes when the voltage of the first pixel power supply ELVDD fluctuates.

The pixel receives the first pixel power ELVDD and the second pixel power ELVSS from a power supply (not shown). The power supply boosts input voltage from the outside to generate the first pixel power ELVDD and inverts the input voltage to generate the second pixel power ELVSS.

At this time, reviewing equation 1, the current flowing to the organic light emitting diode OLED flows corresponding to the voltage of the first pixel power supply ELVDD. If the voltage of the first pixel power supply ELVDD is varied, the amount of current flowing to the organic light emitting diode OLED is also varied, causing non-uniform brightness or luminance.

The power supply receives voltage from a battery or other constant voltage source to generate the first pixel power supply ELVDD and the second pixel power supply ELVSS, where there may be differences in the voltage level between the voltage supplied from the battery and the voltage supplied from other constant voltage source. In this case, if the voltage level of the first pixel power ELVDD generated when the voltage is supplied from the battery is different from the voltage level of the first pixel power ELVDD generated when the voltage is supplied from another constant voltage source, differences in brightness may occur.

SUMMARY OF THE INVENTION

Aspects of exemplary embodiments of the present invention provide a power supply that operates independent of a magnitude of a voltage level, for example, a power voltage level, and an organic light emitting display device using the same.

According to an aspect of an exemplary embodiment of the present invention, there is provided a power supply configured to receive at least one of a first input voltage and a second input voltage and to generate a voltage of a first pixel power and a voltage of a second pixel power, the power supply including: a voltage sensing unit for generating voltage sensing signals corresponding to the first input voltage and the second input voltage; a first power generating unit for receiving the first input voltage and generating the voltage of the first pixel power corresponding to the voltage sensing signals; a second power generating unit for receiving the second input voltage and generating the voltage of the first pixel power corresponding to the voltage sensing signals; and a third power generating unit for receiving the first input voltage and the second input voltage, utilizing the first input voltage or the second input voltage, and generating the voltage of the second pixel power corresponding to the voltage sensing signals.

According to an aspect of another exemplary embodiment of the present invention, there is provided an organic light emitting display device including: a display region for displaying an image corresponding to data signals, scan signals, a voltage of a first pixel power, and a voltage of a second pixel power; a scan driver for generating the scan signals and transferring the scan signals to the display region; a data driver for generating the data signals and transferring the data signals to the display region; and a power supply configured to receive at least one of a first input voltage and a second input voltage and to generate the voltage of the first pixel power and the voltage of the second pixel power, wherein the power supply includes: a voltage sensing unit for generating voltage sensing signals corresponding to the first input voltage and the second input voltage; a first power generating unit for receiving the first input voltage and generating the voltage of the first pixel power corresponding to the voltage sensing signals; a second power generating unit for receiving the second input voltage and generating the voltage of the first pixel power corresponding to the voltage sensing signals; and a third power generating unit for receiving the first input voltage and the second input voltage, utilizing the first input voltage or the second input voltage, and generating the voltage of the second pixel power corresponding to the voltage sensing signals.

With the power supply and the organic light emitting display device using the same according to exemplary embodiments of the present invention, the power supply can operate normally and more stably supply the pixel powers independent of the voltage level of an input voltage, without reducing the efficiency of the power supply, thereby reducing power consumption and improving driving stability.

BRIEF DESCRIPTION OF THE DRAWINGS

The accompanying drawings, together with the specification, illustrate exemplary embodiments of the present invention, and, together with the description, serve to explain the principles of the present invention, of which.

DETAILED DESCRIPTION OF THE INVENTION

Figure 1:
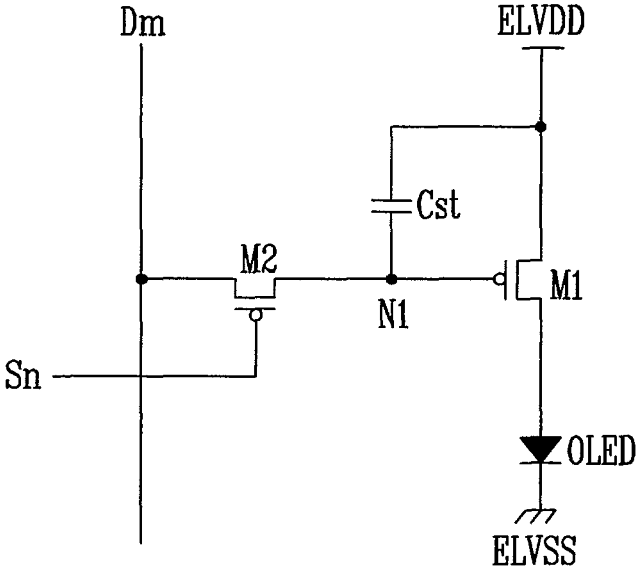
FIG. 1 is a circuit view of a pixel of a general organic light emitting display device.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via one or more additional elements. Further, some of the elements that are not essential to the complete understanding of the invention are omitted for clarity. Also, like reference numerals refer to like elements throughout.

Figure 2:
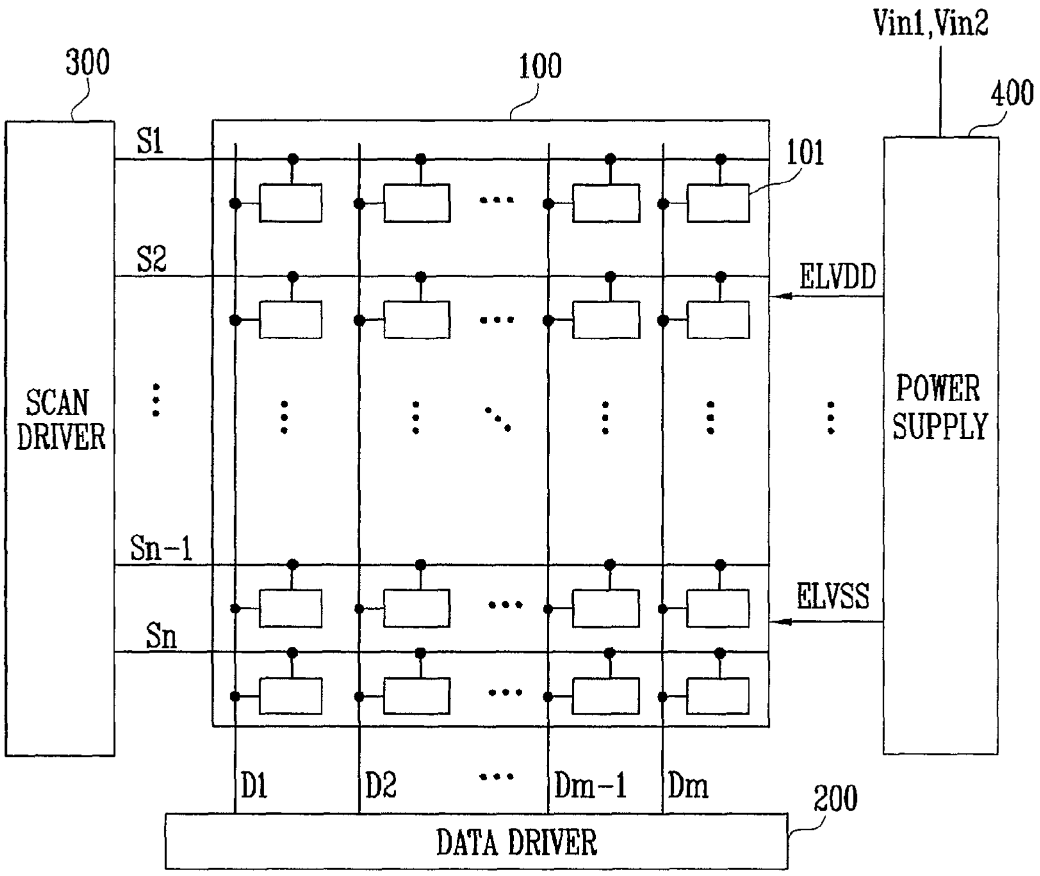
FIG. 2 is a schematic structure view of an organic light emitting display device according to the present invention.

FIG. 2 is a schematic structure view of an organic light emitting display device according to an embodiment of the present invention. Referring to FIG. 2, the organic light emitting display device includes a display region 100, a data driver 200, a scan driver 300, and a power supply 400.

The display region 100 is arranged with a plurality of pixels 101, where each pixel 101 includes an organic light emitting diode OLED (not shown) that emits light corresponding to a flow of current. The display region 100 is arranged with n scan lines S1, S2, . . . , Sn-1, Sn formed in a row direction and for transferring scan signals, and m data lines D1, D2, . . . , Dm-1, Dm formed in a column direction and for transferring data signals.

The display region 100 is driven by receiving first pixel power ELVDD and second pixel power ELVSS from the power supply 400. Therefore, the display region 100 allows current to flow to the respective organic light emitting diodes OLED corresponding to the scan signals, the data signals, the first pixel power ELVDD, and the second pixel power ELVSS to emit light, thereby displaying an image.

The data driver 200 generates data signals using image signals having red, blue, and green components. The data driver 200 applies the generated data signals through the data lines D1, D2, . . . , Dm-1, Dm to the display region 100.

The scan driver 300 generates scan signals, and transfers the scan signals through the scan lines S1, S2, . . . , Sn-1, Sn to specific rows of the display region 100. The pixels 101 receiving the scan signal receive corresponding data signals output from the data driver 200, so that voltages corresponding to the data signals are transferred to the pixels 101.

The power supply 400, which transfers the first pixel power ELVDD and the second pixel power ELVSS to the display region 100, receives an input voltage to generate the first pixel power ELVDD and the second pixel power ELVSS. At this time, the power supply 400 receives the input voltage through a constant voltage source, such as a battery or a computer USB port. In general, the input voltage output from a battery is set to below 4.2V and the input voltage output from a USB port is set to about 5V. In some embodiments, the first pixel power ELVDD supplied to the organic light emitting diode may be set to about 4.8V.

The power supply 400 may generate the first pixel power ELVDD by boosting the input voltage, where efficiency corresponds to the voltage difference between the input voltage and the intended voltage of the first pixel power ELVDD to be output at the time of boosting. In other words, if the power supply 400 is configured for boosting the voltage input from a battery, the efficiency is degraded when a different voltage (e.g., a voltage higher than the voltage input from the battery) is used as the input voltage. For example, in the above arrangement, an input voltage generated from a USB is higher than the voltage of the first pixel power supply ELVDD. Therefore, it may be inefficient or difficult to boost the voltage generated from the USB with the power supply, since the voltage generated from the USB is already higher than the voltage of the first pixel power supply ELVDD.

Therefore, the power supply 400 according to an embodiment of the present invention has a power generating unit that generates the first pixel power ELVDD when receiving the input power from a battery and has another power generating unit that generates the first pixel power ELVDD when receiving the input power from a constant voltage source such as a USB, to generate the first pixel power ELVDD. Such a power supply 400 will be described in more detail with reference to FIG. 3.

Figure 3:
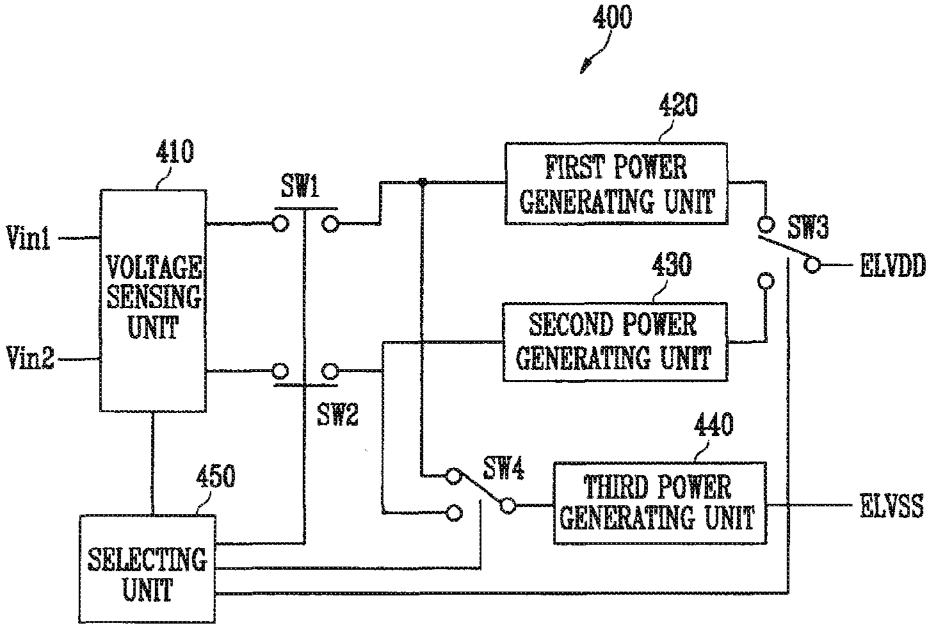
FIG. 3 is a schematic structure view of the power supply of FIG. 2.

FIG. 3 is a schematic structure view of the power supply of FIG. 2. Referring to FIG. 3, the power supply 400 includes a voltage sensing unit 410 for receiving input voltage Vin and sensing the voltage level of the input voltage, a first power generating unit 420 for generating a first pixel power ELVDD, a second power generating unit 430 for generating the first pixel power ELVDD, a third power generating unit 440 for generating a second pixel power ELVSS, and a selecting unit 450.

The voltage sensing unit 410 senses the voltage level of the input voltage to generate a voltage sensing signal. The input voltage may be a first input voltage Vin1 input from a battery and/or a second input voltage Vin2 supplied from a constant voltage source (e.g., a USB connection). The voltage sensing unit 410 senses the voltage level of the input voltage and determines if it is one of the first input voltage Vin1 or the second input voltage Vin2.

The first power generating unit 420 is configured to output the first pixel power ELVDD by boosting the first input voltage Vin1 output from a battery. At this time, the first input voltage Vin1 output from the battery is set to be lower than the voltage of the first pixel power supply ELVDD, so that the first pixel power ELVDD is generated by boosting the first input voltage Vin1.

The second power generating unit 430 is configured to output the first power ELVDD by receiving the second input voltage Vin2 from a constant voltage source other than a battery. In particular, the voltage should be lowered when the second input voltage Vin2 from the USB is higher than the voltage of the first pixel power supply ELVDD, such that, for example, a regulator such as a low drop out (LDO) is used.

The third power generating unit 440 generates the second pixel power ELVSS by inverting the voltage of the first or second input voltage Vin1 or Vin2. Referring back to equation 1, the voltage level of the second pixel power ELVSS does not affect the current flowing to the organic light emitting diode OLED, such that an image with uniform brightness can be displayed despite variations in the voltage level of the second pixel power ELVSS. Therefore, the third power generating unit 440 can be used in both cases, either when receiving the first input voltage Vin1 from a battery or when receiving the second input voltage Vin2 from a constant voltage source such as a USB. Here, the third power generating unit 440 utilizes, for example, a buck boost circuit.

The selecting unit 450 receives the voltage sensing signal generated from the voltage sensing unit 410. The selecting unit 450 transfers the first input voltage Vin1 to the first power generating unit 420 and the third power generating unit 440 when it is determined that the first input voltage Vin1 is utilized, and transfers the second input voltage Vin2 to the second power generating unit 430 and the third power generating unit 440 when it is determined that the second input voltage Vin2 is utilized. In other words, the first input voltage Vin1 is selectively transferred to the first power generating unit 420 and the third power generating unit 440, or the second input voltage Vin2 is selectively transferred to the second power generating unit 430 and the third power generating unit 440, to generate the first pixel power ELVDD and the second pixel power ELVSS, respectively.

In this regard, the selecting unit 450 controls the operations of the first switch SW1, the second switch SW2, the third switch SW3, and the fourth switch SW4 corresponding to the voltage sensing signal generated from the voltage sensing unit 410, to either transfer the first input voltage Vin1 to the first power generating unit 420 and the third power generating unit 440, or to transfer the second input voltage Vin2 to the second power generating unit 430 and the third power generating unit 440.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A power supply configured to receive at least one of a first input voltage and a second input voltage and to generate a voltage of a first pixel power and a voltage of a second pixel power, the power supply comprising:
- a voltage sensing unit for generating voltage sensing signals corresponding to the first input voltage and the second input voltage;
- a first power generating unit for receiving the first input voltage and generating the voltage of the first pixel power corresponding to the voltage sensing signals;
- a second power generating unit for receiving the second input voltage and generating the voltage of the first pixel power corresponding to the voltage sensing signals; and
- a third power generating unit configured to receive the first input voltage and the second input voltage, and to utilize either the first input voltage or the second input voltage to generate the voltage of the second pixel power corresponding to the voltage sensing signals.

2. The power supply as claimed in claim 1, wherein the first input voltage is from a battery and the second input voltage is from a USB port.

3. The power supply as claimed in claim 1, wherein the first power generating unit comprises a boost circuit, the second power generating unit comprises a low drop out (LDO), and the third power generating unit comprises a buck boost circuit.

4. The power supply as claimed in claim 1, further comprising a selecting unit for transferring either the first input voltage to the first power generating unit and the third power generating unit or the second input voltage to the second power generating unit and the third power generating unit corresponding to the voltage sensing signals.

5. The power supply as claimed in claim 1, wherein the first input voltage is lower than the voltage of the first pixel power, and the second input voltage is higher than the voltage of the first pixel power.

6. The power supply as claimed in claim 5, wherein the voltage of the first pixel power is approximately 4.8 volts, the first input voltage is approximately 4.2 volts, and the second input voltage is approximately 5 volts.

7. The power supply as claimed in claim 1, wherein the first power generating unit is configured to generate the voltage of the first pixel power when the first input voltage is received, and the second power generating unit is configured to generate the voltage of the first pixel power when the second input voltage is received.

8. An organic light emitting display device comprising:
- a display region for displaying an image corresponding to data signals, scan signals, a voltage of a first pixel power, and a voltage of a second pixel power;
- a scan driver for generating the scan signals and transferring the scan signals to the display region;
- a data driver for generating the data signals and transferring the data signals to the display region; and
- a power supply configured to receive at least one of a first input voltage and a second input voltage and to generate the voltage of the first pixel power and the voltage of the second pixel power, wherein the power supply comprises:
  - a voltage sensing unit for generating voltage sensing signals corresponding to the first input voltage and the second input voltage;
  - a first power generating unit for receiving the first input voltage and generating the voltage of the first pixel power corresponding to the voltage sensing signals;
  - a second power generating unit for receiving the second input voltage and generating the voltage of the first pixel power corresponding to the voltage sensing signals; and a third power generating unit configured to receive the first input voltage and the second input voltage, and to utilize either the first input voltage or the second input voltage to generate the voltage of the second pixel power corresponding to the voltage sensing signals.

9. The organic light emitting display device as claimed in claim 8, wherein the first input voltage is from a battery and the second input voltage is from a USB port.

10. The organic light emitting display device as claimed in claim 8, wherein the first power generating unit comprises a boost circuit, the second power generating unit comprises a low drop out (LDO), and the third power generating unit comprises a buck boost circuit.

11. The organic light emitting display device as claimed in claim 8, further comprising a selecting unit for transferring either the first input voltage to the first power generating unit and the third power generating unit or the second input voltage to the second power generating unit and the third power generating unit corresponding to the voltage sensing signals.

12. The organic light emitting display device as claimed in claim 8, wherein the first input voltage is lower than the voltage of the first pixel power, and the second input voltage is higher than the voltage of the first pixel power.

13. The organic light emitting display device as claimed in claim 12, wherein the voltage of the first pixel power is approximately 4.8 volts, the first input voltage is approximately 4.2 volts, and the second input voltage is approximately 5 volts.

14. The organic light emitting display device as claimed in claim 8, wherein the first power generating unit is configured to generate the voltage of the first pixel power when the first input voltage is received, and the second power generating unit is configured to generate the voltage of the first pixel power when the second input voltage is received.

* * * * *